United States Patent Office 3,585,238
Patented June 15, 1971

---

3,585,238
2-(p-TOLUENESULFONAMIDO)-5-NITROBENZOPHENONE
Ctirad Podesva, Montreal, Quebec, and Geza Kohan, La Salle, Quebec, Canada, assignors to Delmar Chemicals Limited, Lachine, Quebec, Canada
No Drawing. Filed Nov. 27, 1968, Ser. No. 779,623
Claims priority, application Canada, Nov. 29, 1967, 006,408
Int. Cl. C07c *143/78*
U.S. Cl. 260—556                                    1 Claim

---

ABSTRACT OF THE DISCLOSURE

A 2-halo-5-nitrobenzophenone is reacted with an alkali metal salt of a primary sulfonamide. The resultant products are new and valuable intermediates which can be hydrolyzed in high yields to obtain 2-amino-5-nitrobenzophenone which is itself a valuable intermediate in the preparation of 7-nitro-5-phenyl-1,4-3H-benzodiazepin-2(1H)-one, a psychotropic agent.

---

This invention relates to a new method for the production of 2-amino-5-nitro-benzophenone. This invention also relates to a new intermediate in the preparation of said compound.

2-amino-5-nitrobenzophenone is an important intermediate in the synthesis of 7-nitro-5-phenyl-1,4-3H-benzodiazepin-2(1H)-one, which in turn is a very important psychotropic agent, particularly useful as a sedative, a tranquilizer and a hypnotic of relatively low toxicity. 7-nitro-5-phenyl-1,4-3H-benzodiazenpin-2(1H)-one can be prepared, for example, by allowing phthalimidoacetyl chloride to react with the said 2-amino-5-nitrobenzophenone and treating the resulting 2-phthalimidoacetamido-5-nitrobenzophenone with hydrazine hydrate.

2-amino-5-nitrobenzophenone was for the first time described in 1898 by Ullmann and Mallet in Chemische Berichte vol. 31, page 1695. Their synthesis consisted of reacting 2-chloro-5-nitrobenzophenone with ammonia under pressure and at a temperature of about 160° C. Another synthesis is described e.g. in Canadian Pat. No. 765,409, issued on Aug. 15. 1967 in the name of Aaron L. Nelson and Albert I. Rachlin, according to which benzoyl chloride is condensed with p-nitro-aniline in the presence of anhydrous zinc chloride at a temperature of 200–250° C. Whereas, in the first synthesis, pressure apparatus is needed for carrying out the reaction, in the second method, high temperatures are necessary in order to accomplish the condensation.

We have now found that 2-amino-5-nitrobenzophenone can be obtained in good yields in a reaction sequence which does not necessitate either excessively high temperatures or use of expensive high pressure reaction apparatus. This method has the advantage that it can be performed in standard reaction vessels not especially designed for high pressures or excessively high temperatures. In substance, our method comprises reacting a 2-halogeno-5-nitrobenzophenone with an alkali metal salt of an organic primary sulfonamide whereby a 2-sulfonamido-5-nitrobenzophenone is readily obtained. This substance is then hydrolysed under relatively mild cinditions to the desired 2-amino-5-nitrobenzophenone.

In the preferred embodiment of the present invention the alkali metal salt of the organic primary sulfonamide is constituted by a sodium salt of p-toluene sulfonamide. The reaction is conveniently carried out in the presence of relatively small amounts of an organic solvent in which the alkali metal salt of the sulfonamide used is at least partially soluble and the 2-halogeno-5-nitrobenzophenone preferably totally soluble under the reaction conditions. Convenient temperatures range from about 150° C. to about 170° C. The preferred reaction temperature is that of about 160° and preferred reaction solvents are dimethylformamide or a di-lower alkyl sulfoxide e.g. dimethylsulfoxide. The preferred 2-halogeno-5-nitrobenzophenone is constituted by the easily accessible 2-chloro-5-nitrobenzophenone. The two reactions may be used in approximately equimolar quantities, or an excess of the sulfonamide salt may be used. We have found that when about three mols of the sulfonamide salt are used per one mol of the phenone, the isolation of the reaction product is greatly facilitated. No useful purpose is accomplished by using an excess of 2-chloro-5-nitrobenzophenone since eventually it has to be separated from the reaction mixture. The reaction time may vary between 2 and 8 hours depending on the reaction temperature. The preferred reaction time is about 160° C. is about 5–7 hours.

The 2-sulfonamido-5-nitrobenzophenone is hydrolysed preferably under acidic conditions—to the 2-amino-5-nitrobenzophenone, which is obtained in almost theoretical yields, based on the starting 2-sulfonamido-5-nitrobenzophenone. A preferred agent for hydrolysis is a strong mineral acid, e.g. sulfuric acid. The hydrolysis is conveniently carried out at temperatures ranging from room temperature to about 100° C. The preferred temperatures range from about 50° C. to about 85° C., whereby the hydrolysis is accomplished in about 30 minutes. No useful purpose is accomplished by using lower temperatures since the time of hydrolysis is then somewhat longer. Temperatures somewhat higher than those indicated above, while permissible, are not recommended, as they cannot improve the already high yields any further, neither is there any point to shorten further the already short time of hydrolysis.

Having thus described the substance of the present invention, the following examples are provided for the purpose of further illustration, but they should not be construed as limiting the scope of the disclosed invention, as many variations are possible and will be obvious to people skilled in the art, without, however, departing from the spirit of the invention.

EXAMPLE 1

Into a three-liter three-neck flask equipped with a stirrer and a reflux condenser were placed 104.6 g. of 2-chloro-5-nitrobenzophenone, 231.6 g. of sodium salt of p-toluenesulfonamide and 500 ml. of dimethylformamide and the mixture was heated at 160–170° C. for six hours with stirring. After cooling the reaction mixture was poured on approximately 2 kg. of ice, which was then allowed to melt at room temperature. The reaction product was then extracted with chloroform, the extract was washed with water and the solvent was removed by distillation in vacuo. The residue was dissolved in hot ethanol and the solution was allowed to cool. The 2-(p-toluenesulfonamido) - 5 - nitrobenzophenone separated in crystalline form and was purified for analysis by recrystallization from methanol. M.P. 123–125° C.

*Analysis.*—Calcd. for $C_{20}H_{16}N_2O_5S$ (percent): C, 60.59; H, 4.07; N, 7.07; S, 8.09. Found (percent): C, 60.36; H, 4.18; N, 6.91; S, 7.97.

EXAMPLE 2

A solution of 122.5 g. of 2-(p-toluenesulfonamido)-5-nitrobenzophenone in 200 ml. of concentrated sulfuric acid was kept at about 55° C. for 30 minutes. The reaction mixture was poured on ice which was allowed to melt. The separated crystalline solid was collected by filtration, washed with water until the washings were neutral to universal pH paper, dried and recrystallized from benzene. The product thus obtained, 2-amnio-5-nitrobenzophenone had a M.P. 162–163° C.

We claim:
1. As a new compound 2-(p-toluenesulfonamido)-5-nitrobenzophenone.

References Cited

UNITED STATES PATENTS 3,522,289  7/1970  Archer et al. _____ 260—471

OTHER REFERENCES

Parker, Advances in Org. Chem., vol. 5, "The Use of Dipolar Aprotic Solvents in Org. Chem.," (Interscience, N.Y., 1965), pp. 2–3, 22–3.

Smith, Open-Chain N Cpds., vol. I (Benjamin, N.Y., 1965), pp. 73, 188–9.

HENRY R. JILES, Primary Examiner

C. M. SHURKO, Assistant Examiner

U.S. Cl. X.R.

260—239.3, 570